Patented Oct. 20, 1936

2,057,715

UNITED STATES PATENT OFFICE 2,057,715

ADHESIVE AND COATING COMPOSITION

Harry L. Fisher, Leonia, N. J., assignor, by mesne assignments, to United States Rubber Company, New York, N. Y., a corporation of New Jersey No Drawing. Application September 8, 1933, Serial No. 688,585

8 Claims. (Cl. 134—17.6)

This invention relates to an adhesive and coating composition, and more particularly to a composition especially adapted for uniting rubber to metal or for coating metallic and other articles.

In the chemical and other arts there has been difficulty in the manufacture of suitable containers and shipping receptacles for various corrosive liquids and other materials. In some cases the containers are made of glass or other material unattacked by the corrosive liquids, but in the case of glass the material is quite fragile and unsuited for large receptacles or for transportation purposes, and many of the other expedients used are too expensive. As a result attempts have been made to use receptacles and tank cars made of steel or iron and to line them with rubber, but difficulty has been encountered in obtaining a bond between the rubber and metal which is at the same time strong and unaffected by conditions met during use, such as high temperatures, and which is also economical to produce and simple to make.

A further use in the arts for composite rubber and metal articles is in cases where the articles are exposed to corrosive gases, such as parts of blower or exhaust systems, and in cases where metal is lined with rubber to prevent abrasion of the metal, as in rubber lined metal chutes and in conveyor buckets and various other parts of conveying systems handling abrasive materials. Furthermore it is desirable to provide strong adhesion between rubber and metal parts in the manufacture of vibration-absorbing engine mountings and the like.

One method of uniting rubber to iron or steel is to plate the metal with brass, apply a cement of unvulcanized rubber compounded to form hard rubber, dry, and then superpose the rubber lining and vulcanize. This method is not of general application, is unsuitable for the lining of receptacles, and a further objection is that a relatively long time and high temperature are required to vulcanize the dried cement deposit to hard rubber, and there is a tendency to over-vulcanize the adjacent soft rubber by reason of the migration of uncombined sulphur from the hard rubber cement. Another method used is to unite the metal and rubber by means of certain thermoplastic rubber isomers, and while good bonds at ordinary temperatures are obtained in such case, the thermoplastic softens under heat at temperatures as low as 80° C., and the bond is then weakened. Hence, this method is not applicable in the case of receptacles or other articles subjected to temperatures higher than about 70° C.

A further difficulty in the chemical and other arts is to obtain a protective coating composition applicable to metal, wood, paper and other materials, which is strongly adhesive, flexible and highly resistant to various chemical reagents.

The present application is a continuation-in-part of my application Serial No. 474,298, filed August 9, 1930.

An object of the present invention is to provide an improved adhesive composition suitable for uniting rubber and rubber-like materials to metal, and which is also applicable for uniting various other materials such as wood, leather, paper, fabric, etc.

A further object is to provide an adhesive composition which after application may be non-thermo-plastic and hence will not tend to soften and weaken the joint in a composite article when the latter is subjected to high temperatures.

A further object is to provide an adhesive composition which is economical and simple in application.

A still further object is to provide an improved coating composition.

Other objects will appear from the detailed description and claims.

I have discovered that by mixing certain rubber products which in themselves have little or no bonding strength, and interposing a layer of the resulting composition between bodies of metal and rubber or between other bodies which it is desired to adhesively unite, a composite article is obtained which has all of the desired properties of good bonding strength, cheapness and durability. The combination is further improved by the addition of certain softening agents and/or vulcanizing ingredients including accelerators. The adhesive is suitable for uniting such materials as rubber, rubber-like hydrocarbons such as balata, synthetic rubbers, leather, wood, fabric, paper, metal, glass, etc. and in those cases where a very high bonding strength is not required further vulcanization of the adhesive, after its application to the surfaces to be united, may be dispensed with. The rubber or similar materials may be employed in the form of calendered sheet or as the deposit from a natural or artificial dispersion. In those cases where a maximum bonding strength is desired, and particularly in the union of materials such as rubber and metal, the applied adhesive may be vulcanized in situ with a corresponding increase in strength. This also renders the bond non-thermoplastic at temperatures up to at least 120° C., which greatly extends its field of usefulness.

In one form of the adhesive composition of the invention, there may be prepared a mixture composed of a solution of hard rubber or a rubber of the hard rubber type and a solution of rubber vulcanized to a substantially less degree of combined sulphur. Both the solution of hard rubber and the solution of rubber vulcanized to a less degree of combined sulphur may be prepared in a manner similar to that described in patent to Gibbons et al. No. 1,745,533, issued February 4, 1930. In the first example in the latter patent, it is stated that soft vulcanized rubber may be dissolved by heat in a suitable solvent, such as solvent naphtha, sufficient sulphur added to produce hard rubber, and the solution then heated until the rubber contains more than 15% of combined sulphur and substantially no free sulphur, and in this specific example, it is stated that the reaction will require 2½ hours at a temperature of approximately 163° C. The patent also states that lower temperatures may be used with a correspondingly longer time, and as examples the solution may be heated for 8 hours at a temperature corresponding to 90 pounds steam pressure, or for 48 hours at 35 pounds steam pressure. The hard rubber solution thus obtained will be hereinafter designated product "A". This solution of hard rubber may then be mixed with a similar solution the rubber of which has been vulcanized to a substantially less degree of combined sulphur, usually to 4 to 6% combined sulphur. For instance, there may be used for the latter solution the product obtained by heating a solution of soft vulcanized rubber with sulphur for 2 hours at 35 pounds steam pressure, which product will hereafter be known as No. 1, or there may be used the product obtained by heating a solution of soft vulcanized rubber with sulphur for four hours at 35 pounds steam pressure, which latter product will hereafter be known as No. 2. If desired, the solution of hard rubber may be mixed with a solution of soft vulcanized rubber, such as that used for the preparation of products No. 1 and No. 2, without the addition of any further sulphur. The solution of soft vulcanized rubber employed for the preparation of the further vulcanized solutions may be prepared under the time and temperature conditions specified in the patent to Gibbons et al., that is, by heating the soft vulcanized rubber, such as inner tube scrap, in a kettle with a solvent such as high flash solvent naphtha for two to three hours at approximately 163° C., or instead it may be prepared by heating the scrap and solvent for from 16 to 90 hours at a temperature corresponding to 35 pounds steam pressure. The solution of soft vulcanized rubber containing no further added sulphur will hereafter be referred to as product No. 3.

When mixing the solution of hard rubber and the solution of rubber vulcanized to a less degree of combined sulphur, the concentration of the solutions may be varied according to conditions, but approximately 10 to 25% solids has been found to be suitable in most instances. The hard rubber solution and the solution of rubber vulcanized to a less degree of combined sulphur may be mixed in different proportions, but proportions varying from 8 to 1 down to 1 to 1 of the respective sulphurized rubber have been found most suitable when bonding rubber to metal, and the composite rubber-metal articles thus obtained have given stripping pulls up to 100 pounds per inch and higher. While it is preferred to use a rubber solution the rubber of which has 15% or more combined sulphur, as that ingredient of the composition which has the higher ratio of combined sulphur, the invention is not limited to such use, and there may be employed instead a rubber solution which has a less proportion of combined sulphur.

If desired raw or unvulcanized rubber or balata may be included in any of the above described adhesive compositions, whereby the body of the composition, and the tackiness of dried uncured layers deposited therefrom, are increased, for which purpose any of the usual raw rubbers, such as pale crepe, spray dried rubber, etc. may be used. An accelerator of vulcanization with or without additional sulphur and other vulcanizing ingredients such as zinc oxide, may also be included. Also, any one of the described solutions of vulcanized rubber may be incorporated with unvulcanized rubber or rubber-like hydrocarbon material (such as balata), and vulcanizing ingredients, to produce an excellent adhesive.

In all the described forms of the invention the composition embodies in part a rubber-like hydrocarbon material combined with sulphur and differing substantially in its combined sulphur content from the remaining rubber-like hydrocarbon material, that is, the remaining material may have less combined sulphur and/or no combined sulphur.

The compositions above described have been found to give very high resistance to separation, particularly when further vulcanized in situ. When testing the strength of the bond, for instance between rubber and metal, a standard method of preparing a sample is to apply a solution of the adhesive composition to a flat plate of cleaned metal, dry, then superimpose thereon two layers of a calendered vulcanizable rubber compound having a fabric reinforcement therebetween of square woven fabric such as that sometimes used in tire construction, and then vulcanize the composite material. The fabric insert is used merely to prevent stretching of the rubber during the stripping test and thereby insures accuracy in the pull figures obtained. In carrying out the stripping test, a strip one inch wide, and extending inwardly from an edge of the composite rubber-metal article, is marked out on the rubberized fabric stock and the latter is then cut through on the marked lines to the surface of the metal. The one inch wide strip thus formed is loosened at an edge of the composite rubber-metal article, and the strip end and the metal plate beneath it are fastened respectively in the lower and upper grips of a standard tensile-testing machine, and the rubber-fabric strip pulled downward, the number of pounds of pull required to separate the rubber-fabric from the metal being indicated by the machine.

The following examples give the results of tests carried out on rubberized fabric-metal articles in which the bonding was accomplished by the use of the adhesive compositions of the present invention.

*Example 1.*—Using a mixture of the hard rubber solution A and the No. 2 product before mentioned, in proportions varying from 6 to 1 to 8 to 1, the pull obtained was between 50 and 52 pounds when an ordinary tire tread stock was used as the cover stock.

*Example 2.*—Using a mixture of the hard rubber solution A and a solution of product No. 1, previously described, on a tread stock, a pull of 27 pounds was obtained using a 4 to 1 ratio of the solutions; a pull of 26 pounds was obtained using a 3 to 1 ratio; and a pull of 24 pounds was obtained with a 2 to 1 ratio; while with a 7 to 1 ratio a pull of 42 pounds was obtained.

*Example 3.*—Using a mixture of the hard rubber solution A and the solution of soft vulcanized rubber, previously referred to as product No. 3, a 6 to 1 mixture with a tire tread stock gave a pull of 27 pounds, while a 4 to 1 mixture with a tread stock gave a pull of 24 pounds. Using a tire carcass stock, a 2 to 1 mixture gave 17 pounds pull.

In the above examples, the cure of the composite rubber-metal article was in a press, and unless otherwise specified the cure for a tread stock was 75 min. at 40 pounds steam pressure and for a carcass stock 60 min. at 40 pounds steam pressure.

If desired, a vulcanized stock may be used instead of a vulcanizable one and in this case the curing time required to produce a good bond is very much lessened under the same temperature conditions.

In applying the bonding mixture to the metal, the latter may be cleaned in any suitable manner as by sand blasting or by the use of a suitable pickle, and the bonding mixture then applied in any suitable way such as by pouring, spraying or spreading. The bonding mixture is then allowed to dry and the rubber stock applied and rolled down. While the invention is particularly applicable to the uniting of rubber to ferrous metals, such as iron or steel, it has also given good results with other metals such as aluminum and brass.

As showing that the bond of the composite article is not affected by high temperatures, a test was made using as the bonding material a mixture of the hard rubber solution A and the No. 2 product before described, and after vulcanizing, the bond between iron and a tire tread stock was excellent under high temperatures. After 16 hours heat at 212° F. a pull of 49 pounds was obtained on the composite material immediately after it was removed from the oven, and a pull of 50 pounds was obtained when tested cold.

Further improvement is effected by adding to the bonding composition certain organic softening agents, among which may be mentioned aniline, dimethylaniline, cyclohexanol, cyclohexanone, nitrobenzene, methyl salicylate, cumar resin, liquid factice, BRV, which is a product made by the Barrett Company, and is a liquid high boiling coal tar distillate consisting chiefly of aromatic hydrocarbons, of specific gravity above 1.130 at 38° C. and boiling practically all above 300° C., and paraflux (a product of the C. P. Hall Company), which is an especially purified residue obtained in the cracking of petroleum for gasoline and is made according to U. S. Patent No. 1,611,436, granted to Charles P. Hall. As examples of the use of such softeners, a mixture of the hard rubber solution A and the No. 2 product gave the following results with various softeners, the products being used in a ratio of two parts to one and in a concentration of about 10%.

Adding one half part of liquid factice, the composite article gave a pull of 58 pounds in the case of a rubber tire carcass stock on iron, and a pull of 88 pounds in the case of a tread stock on iron.

Adding one half part of a 10% solution of cumar resin, a pull of 96 pounds was obtained with a tread stock.

Adding 2 parts of a 10% solution of paraflux a pull of 94 pounds was obtained with a tread stock, and with one half part of paraflux, a pull of 29 pounds was obtained with a carcass stock and 80 pounds with a tread stock.

Adding one half part of BRV a pull of 97 pounds was obtained with a tread stock, while with one part of BRV, a pull of 108 pounds was obtained and with two parts a pull of 125 pounds.

It has also been found that when both a softener and an organic accelerator are employed in combination with the mixture of the two rubber solutions, improved results are obtained over the mixture of rubber solutions alone.

A mixture of the hard rubber solution A, the No. 2 product, BRV, the vulcanization accelerator triethyltrimethylenetriamine combined with stearic acid, and zinc oxide, in the respective proportions of 10 cc., 5 cc., 0.5 gram, 0.05 gram, and 0.03 gram, gave a pull with a carcass stock of 44 pounds, and with a tread stock of 76 pounds.

A mixture of the same two rubber solutions with aniline and tetramethyl thiuram disulphide in the respective proportions of 12 cc., 6 cc., 2 cc., 0.009 gram, gave a pull with a carcass stock of 72 pounds and with a tread stock of 76 pounds. A mixture of the same two rubber solutions with dimethylaniline and tetramethyl thiuram disulphide in the same respective proportions gave a pull with a carcass stock of 66 pounds and with a tread stock of 114 pounds. The same two rubber solutions with cyclohexanol and tetramethyl thiuram disulphide in the same respective proportions gave a pull with a carcass stock of 56 pounds and with a tread stock of 102 pounds. The last four examples of the adhesive compositions also gave excellent results in the lining of barrels and tanks using stocks compounded to cure in exhaust steam and cured in situ for 24 hours. Due to the fact that these stocks contained no reinforcement of fabric, no machine stripping tests were made as the stretching of the rubber renders such tests unreliable.

In any of the described compositions, usual vulcanizing ingredients such as sulphur and zinc oxide as well as accelerator may be incorporated, and various known vulcanizing procedures may be employed.

As showing that the remarkable results obtained in the bond are due to the combination of materials comprising the adhesive compositions and not to the individual ingredients, it is pointed out that where a test was made using only the hard rubber solution A, in which the rubber was combined with 15% or more of sulphur, to bond iron to a carcass stock by curing for 45 min. at 40 pounds steam pressure in a press, the pull was only 0.5 pound, and the same results were obtained with a tread stock. Using separately either of the rubber solutions designated as Nos. 1 and 2, under the same conditions, there was obtained a pull of only 3 to 7 pounds with a carcass stock and two pounds with a tread stock. Using the rubber solution designated as No. 3, the pull was only 7 pounds with a carcass stock and 3 pounds with a tread stock.

The invention provides an adhesive which, while particularly adapted for uniting rubber and rubber-like material to metal, is also capable of use in uniting many other materials. When vulcanized, the bond is non-thermoplastic up to temperatures at least as high as 120° C.

The compositions may also be employed to provide protective coatings on metal and other articles, said coatings being strongly adherent, and resistant to acids, alkalies, solvents, and chemicals in general. In such cases the coating may be hardened by heating in air, steam, or water, or otherwise, or may remain unvulcanized.

While specific embodiments have been disclosed, the invention is capable of modification in many ways, and it is not desired to limit it otherwise than as required by the prior art.

Having thus described my invention, what I claim and desire to protect by Letters Patent, is:

1. A composition comprising; a mixture of products resulting from further vulcanizing one solution of soft vulcanized rubber in the presence of additional sulphur to at least 15% of chemically combined sulphur and similarly vulcanizing another such solution to a relatively low degree of chemically combined sulphur; and an organic softener for rubber.

2. A composition comprising; a mixture of products resulting from further vulcanizing separate solutions of soft vulcanized rubber in the presence of additional sulphur to widely divergent degrees of combined sulphur, with the product of higher combined sulphur content predominating and having at least 15% combined sulphur; an organic softener for rubber; and an organic accelerator of vulcanization.

3. A composition comprising a mixture of, a solution of rubber of at least 15% chemically combined sulphur content, a solution of rubber of about 4% to 6% chemically combined sulphur content, a solution of unvulcanized rubber, an organic softener for rubber, and vulcanizing ingredients including an organic accelerator.

4. A composition comprising a rubber solvent, and in solution therein rubber chemically combined with at least 15% of sulphur, rubber chemically combined with a relatively low percentage of sulphur, unvulcanized rubber, and vulcanizing ingredients.

5. A homogeneous, fluid composition comprising a mixture of vulcanized rubber solutions, the rubber of one of which solutions has at least 15% of chemically combined sulphur, the rubber of another of which solutions has a relatively low percentage of chemically combined sulphur, and vulcanizing ingredients.

6. A composition comprising a mixture of, a solution of soft vulcanized rubber further vulcanized in solution in the presence of additional sulphur to at least 15% of chemically combined sulphur, and a solution of soft vulcanized rubber further vulcanized in solution in the presence of additional sulphur to about 4% to 6% of chemically combined sulphur.

7. A composition comprising a mixture of, a solution of soft vulcanized rubber further vulcanized in solution in the presence of additional sulphur to at least 15% of chemically combined sulphur, and a solution of soft vulcanized rubber further vulcanized in solution in the presence of additional sulphur to a relatively low degree of chemically combined sulphur, in proportions of substantially 2:1 to 8:1 of the respective sulphurized rubbers.

8. A composition comprising a rubber solvent, rubber having a proportion of chemically combined sulphur equal to that of hard rubber, rubber having a relatively low proportion of chemically combined sulphur, unvulcanized rubber, an organic softener for rubber, and vulcanizing ingredients including an organic accelerator.

HARRY L. FISHER.